United States Patent [19]

Stocking

[11] Patent Number: 4,534,434

[45] Date of Patent: Aug. 13, 1985

[54] PROPULSION PLANT FOR AIR-CUSHIONED VEHICLES

[76] Inventor: William B. Stocking, 981 Manzanita St., Chula Vista, Calif. 92011

[21] Appl. No.: 500,557

[22] Filed: Jun. 2, 1983

[51] Int. Cl.³ ............................................. B60V 1/15
[52] U.S. Cl. .................................. 180/120; 180/122; 180/129
[58] Field of Search ............... 180/117, 122, 129, 120

[56] References Cited

U.S. PATENT DOCUMENTS

| | | | |
|---|---|---|---|
| 3,127,863 | 4/1964 | Tinajero | 180/117 |
| 3,253,666 | 5/1966 | Kiernan et al. | 180/122 |
| 3,262,510 | 7/1966 | Froehler | 180/122 |
| 3,285,357 | 11/1966 | Beardsley | 180/122 |
| 3,486,718 | 12/1969 | Marchal et al. | 180/117 |
| 3,587,771 | 6/1971 | Faure | 180/117 X |
| 3,888,330 | 6/1975 | Eggington et al. | 180/117 X |
| 4,111,277 | 9/1978 | Peissel et al. | 180/122 |

*Primary Examiner*—Joseph F. Peters, Jr.
*Assistant Examiner*—Charles R. Watts
*Attorney, Agent, or Firm*—Charmasson & Holz

[57] ABSTRACT

An air-cushioned vehicle wherein the air pressure differential between the plenum chamber and the atmosphere is used to charge a jet engine; thus allowing the use of pulse-jet or ram-jet power plants which require precharging and improving the performance of other engines.

The system is implemented by either ducting the pressurized air from the plenum chamber into the engine intake, or by installing the engine inside the plenum chamber itself.

5 Claims, 5 Drawing Figures

PROPULSION PLANT FOR AIR-CUSHIONED VEHICLES

FIELD OF THE INVENTION

This invention relates to air-cushioned vehicles, ground effect vehicles, or hovercraft as they are generally known, for use on land, ice, or water; and more specifically to the power plants used to propel and guide them.

These vehicles support themselves a small distance above the ground or water surface on a cushion of pressurized air contained in their generally bell-shaped understructure called the plenum chamber defined by the floor of the vehicle and its peripheral skirt. The air pressure within the plenum is kept higher than the ambient atmospheric pressure by a powerful fan mounted on the vehicle which directs air downward into the plenum. Since the supporting surface is often irregular and apt to cause leakage of air between it and the peripheral skirt, the lifting fan is designed to deliver a much higher volume of air than is necessary to support the vehicle.

An alternate design called the air-curtain machine employs a peripheral jet of air directed downward which issue from a series of ring-shaped nozzles at high velocity. The air curtain forms a skirt-like barrier, thereby creating a stagnant bubble of high pressure air between the flat lower surface of the craft and the supporting surface. Water is sometimes used in place of air to generate the curtain on seagoing vehicles of this type.

The forward motion of the vehicle is provided by the same type of power plant used in aviation i.e. propellers driven by reciprocating engines, turbo prop engines and various types of jet engines. Laterally mounted engines are sometimes used to provide directional control and breaking. For low speed propulsion and control, air nozzles fed from some of the pressurized supporting air have been used in early designs. Jet engines are preferred however, for high speed operation.

The simplest and most efficient jet engine is the ram-jet which requires no compressor or turbine. This type of engine however, can only be operated at high speed where the air is forced at sufficient speed into the intake to provide the necessary propulsive volume. The efficiency of turbo jet over turbo prop and turbo fan engine is appreciable only at high speed, that is, when there is a substantial difference between the pressure at the air inlet and the air pressure behind the exhaust pipe.

SUMMARY OF THE INVENTION

The invention takes advantage of the pressure difference which exists between the plenum of an air-cushioned vehicle and the surrounding atmosphere to precharge the propelling and the directional jet engines.

The principal object of the invention is to allow the use of ram-jet engine and pulse-jet engines at low ground speed on air-cushioned vehicles.

Another object is to improve the efficiency of other types of jet engines used for the propulsion directional control of this type of vehicle.

DESCRIPTION OF THE PREFERRED EMBODIMENT OF THE INVENTION

Figure 2:
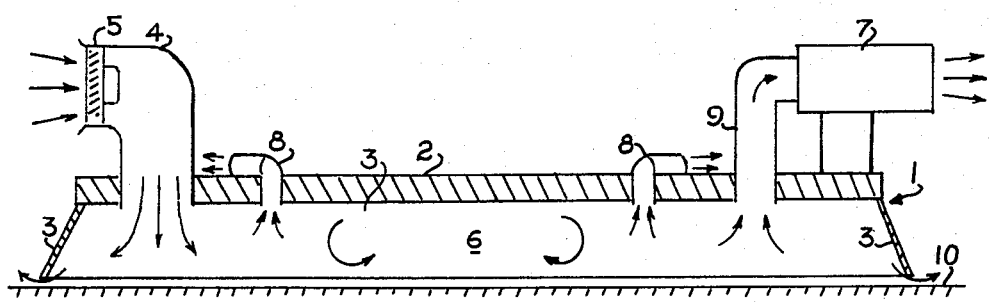
FIG. 2 is a diagrammatic cross-sectional view taken along line 2—2 of FIG. 1.

Referring now to the drawing, there are shown in diagrammatic forms various embodiments of the invention.

Figure 1:
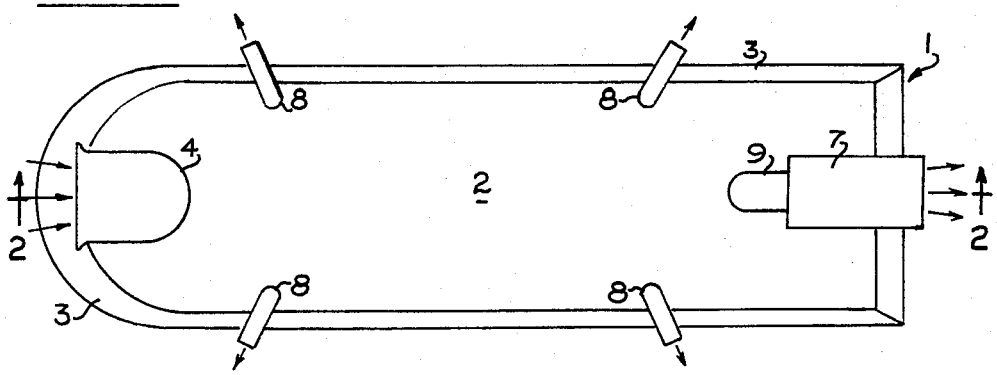
FIG. 1 is a diagrammatic top plan view sketch of a air-cushioned vehicle.

FIGS. 1 and 2 depict a air-cushioned vehicle also known as ground-effect vehicle 1 designed to ride on a cushion of pressurized air over a generally flat surface 10 of ground, water or ice. The infrastructure of the vehicle 2 has a generally flat underside which is surrounded by a peripheral skirt 3 directed downward. The underside of the vehicle, the skirt 3 and the supporting surface 10 delineate a plenum chamber into which ambient air is forced by a motor-driven fan 5 mounted in the intake chimney 4. The power of the motor-driven fan 5 is designed to provide more air than the amount which leaks under the skirt 3 due to irregularities in the supporting surface 10. When the air pressure built-up within the plenum 6, times the virtual horizontal plane corresponding to the underside of the vehicle, exceeds the total weight of the structure, the vehicle 1 begins to rise above ground.

The aft-mounted engine 7 can then be fired to propel the vehicle horizontally above the supporting surface 10. The jet engine is charged by feeding into its intake part of the pressurized air held in the plenum 6 through duct 9. This forced-air feeding into the engine 7 allows for the use of ram-jet and pulse-jet engines which under normal conditions could not be ignited except at very high speeds. Various auxiliary engines 8 are located on the sides of the vehicle 1 to provide directional control and/or breaking. These auxiliary engines are similarly fed with pressurized air from the plenum 6.

Depending upon the weight of the craft 1 and the size of the engines 7 and 8 the total required air intake drawn from the plenum may vary from 30 cubic meters per second to 1,000 cubic meters per second. Lift fans on ground-effect vehicles can currently deliver up to 2,000 cubic meters per second; enough to supply the engines and maintain the necessary lifting pressure in the plenum.

Other types of power plants such as turbo-jet engines or gas turbines could be used and their performance improved by precharging them with the pressurized air from the plenum.

Figure 3:
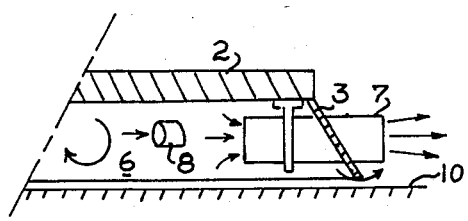
FIG. 3 is a partial cross-sectional view showing an alternate embodiment of the engine installation.

FIG. 3 is a partial illustration of an alternate way of mounting the propelling engine 7 and the auxiliary engines 8 inside the plenum 6 with their exhaust pipe protruding through the skirt 3.

Figure 4:
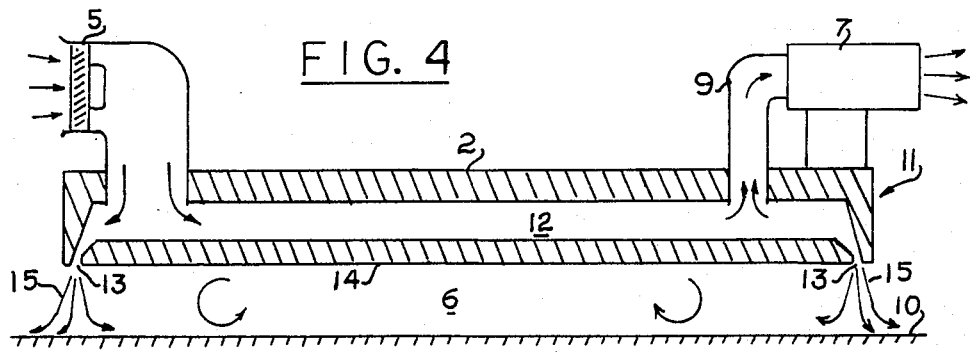
FIG. 4 is a diagrammatic cross-sectional view of a air-curtain type vehicle improved according to the invention.

FIG. 4 illustrates the application of the invention to an air-curtain type of ground-effect machine 11. In this particular embodiment the ambient air is drawn by the lift fan 5 into a reservoir 12 from which it is leaked out through a series of peripheral nozzles 13 which direct the toward the ground a air-curtain 15 of high velocity. Part of the air ejected from the nozzles 15 accumulate underside the vehicle where it is confined in a plenum chamber delineated by the air-curtain 15, the supporting ground surface 10 and the understructure 14 of the vehicle. When the air-pressure built up in the plenum 6 is enough to compensate for the weight of the vehicle the latter is raised above the supporting surface 10 and may be propelled by engine 7. In this embodiment the air intake of the propelling engine 7 is connected to the pressurized air reservoir 12 by duct 9. This embodiment has the advantage of feeding into the engine 7 air which is at a higher pressure than the air occupying the plenum 6 and which is free of dust and other debris raised by the air turbulance under the vehicle.

Figure 5:
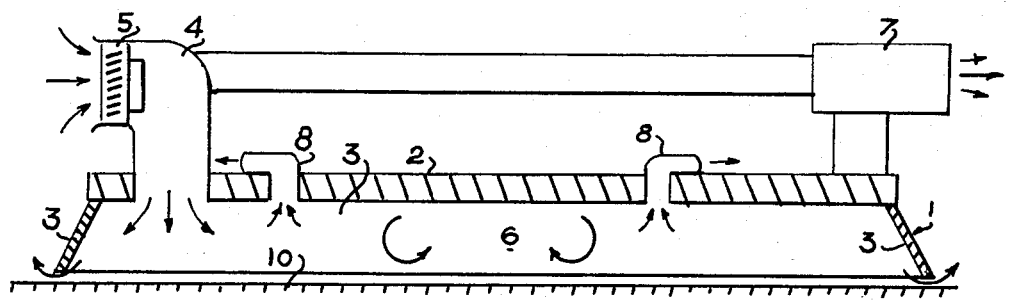
FIG. 5 is a view similar to FIG. 2 showing a modified vehicle.

In the first embodiment illustrated in FIG. 1 and 2 it may also be found advantageous to feed the engines 7 and 8 with pressurized air ducted directly from the intake chimney 4 rather than from the plenum 6, as shown in FIG. 5.

While the preferred embodiments of the invention have been described and modifications thereto have been suggested other embodiments may be devised and modifications made thereto without departing from the spirit of the invention and the scope of appended claims.

What is claimed is:

1. A power plant for supporting a vehicle over a volume of pressurized air and for propelling said vehicle over a generally flat surface, which comprises:
   means for creating said volume of pressurized air under the floor of said vehicle;
   an air-fed engine dimensioned and oriented to displace said vehicle along said surface, said engine having an air intake; and
   means for feeding a portion of said pressurized air into the air intake of said engine, said portion of pressurized air essentially providing all the air used to feed said engine.

2. The power plant claimed in claim 1 wherein said volume of pressurized air is confined in a plenum delineated by the underside of said vehicle, a peripheral skirt and said surface;
   said engine is mounted outside said plenum;
   said means for feeding comprises a duct between said plenum and said air intake.

3. The power plant claimed in claim 1 wherein said volume of pressurized air is confined in a plenum delineated by the underside of said vehicle, a peripheral skirt and said surface;
   said engine is mounted outside said plenum;
   said means for creating said volume of pressurized air comprises an intake chimney, a motor-driven fan drawing ambient air through said intake chimney into said plenum;
   said means for feeding comprise a duct between said intake chimney and the air intake of the engine.

4. The power plant claimed in claim 1 wherein said volume of pressurized air is confined in a plenum delineated by the underside of said vehicle, a peripheral skirt and said surface;
   said engine is installed within said plenum and draws air therefrom.

5. The power plant claimed in claim 1 wherein said means for creating said volume of pressurized air comprises;
   a reservoir of compressed air;
   a series of nozzles mounted on the periphery of the vehicle understructure, said nozzle being connected to said reservoir and creating a downward curtain of air around the said vehicle;
   said volume of the pressurized air is confined within a plenum delineated by the underside of said vehicle, said curtain of air and said surface;
   and means for connecting said reservoir to the air intake of said engine.

* * * * *